US00RE40204E

(19) United States
(12) Reissued Patent
Yamamoto

(10) Patent Number: US RE40,204 E
(45) Date of Reissued Patent: Apr. 1, 2008

(54) PORTABLE ELECTRONIC TERMINAL APPARATUS HAVING A PLURALITY OF DISPLAYS

(75) Inventor: Katsuhisa Yamamoto, Shinagawa-ku (JP)

(73) Assignee: Ricoh Company, Ltd., Tokyo (JP)

(21) Appl. No.: 10/677,170

(22) Filed: Oct. 2, 2003

Related U.S. Patent Documents

Reissue of:
(64) Patent No.: 6,297,945
Issued: Oct. 2, 2001
Appl. No.: 09/537,265
Filed: Mar. 29, 2000

(30) Foreign Application Priority Data

Mar. 29, 1999 (JP) ..... 11-086099

(51) Int. Cl.
*G06F 1/16* (2006.01)
*H04M 11/10* (2006.01)

(52) U.S. Cl. ..... 361/681; 345/905; 345/169; 312/223.1; 455/450; 361/682

(58) Field of Classification Search ..... 361/679–687, 361/724–727; 345/169, 905, 520; 312/223.1–223.6; 455/557, 450; 710/305; 711/201
See application file for complete search history.

(56) References Cited

U.S. PATENT DOCUMENTS 5,138,590 A * 8/1992 Masuda et al. ..... 368/10
5,508,720 A * 4/1996 DiSanto et al. ..... 345/169
5,646,649 A * 7/1997 Iwata et al. ..... 345/173
5,673,170 A * 9/1997 Register ..... 361/681
6,125,286 A 9/2000 Jahagirdar et al. ..... 455/566
6,134,103 A * 10/2000 Ghanma ..... 361/681
6,445,574 B1 * 9/2002 Saw et al. ..... 361/681

FOREIGN PATENT DOCUMENTS

| | | |
|---|---|---|
| JP | 6-292195 | 10/1994 |
| JP | 07-050711 | 2/1995 |
| JP | 9-181801 | 7/1997 |
| JP | 09-261750 | 10/1997 |
| JP | 10-198291 | 7/1998 |
| JP | 10-224268 | 8/1998 |
| JP | 11-4301 | 1/1999 |
| JP | 11-017579 | 1/1999 |

* cited by examiner

*Primary Examiner*—Hung Van Duong
(74) *Attorney, Agent, or Firm*—Oblon, Spivak, McClelland, Maier & Neustadt, P.C.

(57) ABSTRACT

A portable electronic terminal apparatus includes a main body, an information input mechanism, a plurality of displays, a communications mechanism, and a flip panel. The main body has a hollow section. The information input mechanism inputs various kinds of information including data and instructions. Each of the displays shows the various kinds of information input through the input mechanism. The communications mechanism transmits and receives the various kinds of information input through the input mechanism. The flip panel is movably mounted on the main body and is configured to rotate to open and close about a side edge portion of the flip panel. This flip panel is retracted in the hollow section of the main body when the flip panel is closed. In addition, one of the displays is mounted on the flip panel.

54 Claims, 9 Drawing Sheets

PORTABLE ELECTRONIC TERMINAL APPARATUS HAVING A PLURALITY OF DISPLAYS

Matter enclosed in heavy brackets [ ] appears in the original patent but forms no part of this reissue specification; matter printed in italics indicates the additions made by reissue.

CROSS-REFERENCE TO RELATED APPLICATIONS

This application claims priority under 35 U.S.C. §119 to Japanese patent application No. JPAP11-086099 filed on Mar. 29, 1999, the entire contents of which are hereby incorporated by reference.

BACKGROUND OF THE INVENTION

1. Field of the Invention

The present invention generally relates to a portable electronic terminal apparatus, and more particularly to a portable electronic terminal apparatus which includes a flip panel and a plurality of displays.

2. Discussion of the Background

Recently, the amount of information for electronic apparatuses to exchange has greatly been increased through data communications verification because of rapid proliferation of portable communications equipment and an establishment of the corresponding infrastructure. In such a circumstance, portability as well as data communications capability has become more important, especially in a portable electronic apparatus (e.g., a cellular mobile phone, a personal assistant device, and the like).

In general, it is difficult to obtain both portability and visibility at the same time in a portable electronic apparatus. Such an apparatus needs to be lighter and smaller for increased portability. For instance, the area reserved for the display of a portable electronic apparatus can be reduced to increase portability. Typically, a portable electronic apparatus has a single display on which various kinds of information are selectively shown as user instructions; such as a screen scroll function, a function for switching over to another function, and so forth. In such a portable electronic apparatus, the user is usually required to perform complex manipulation of the display to finally read incoming mail and/or information received from information service providers.

As one example of the portable electronic apparatus, a mobile cellar phone, as illustrated in FIG. 1, is provided to overcome the above-mentioned problem. The mobile cellar phone of FIG. 1 includes a main body 51, a display 51, an antenna 52, and a loudspeaker 53. In this mobile cellar phone, a mechanical key pad is not used, instead a touch-sensitive display is employed so as to fit in a relatively small area. Since the touch-sensitive display does not provide a tactile "click" response, the user is required to keep watching the display to make sure the input is entered properly. Therefore, the operability of the mobile cellar phone of FIG. 1 is reduced.

SUMMARY OF THE INVENTION

The present invention provides a novel portable electronic terminal apparatus which includes a main body, an information input mechanism, a plurality of displays, a communications mechanism, and a flip panel. The main body has a hollow section. The information input mechanism enables input of information, including data and instructions. A plurality of displays display the information input through the input mechanism. The communications mechanism transmits and receives the input information. The flip panel is movably mounted on the main body and is configured to rotate to open and close about a side edge portion of the flip panel. This flip panel is retracted in the hollow section of the main body when closed. In addition, one of the plurality of displays is mounted on the side of the flip panel that is exposed when closed.

One of the plurality of the displays may be mounted on a surface of the hollow section of the main body.

Another display may be mounted on another side of the flip panel.

One of the displays operates when the flip panel is closed, and the other display operates when the flip panel is opened.

Each of the displays may be a polymer-film liquid crystal display.

The displays may selectively be used by a user instruction input through the information input mechanism.

BRIEF DESCRIPTION OF THE DRAWINGS

A more complete appreciation of the present invention and many of the attendant advantages thereof will be readily obtained as the same becomes better understood by reference to the following detailed description when considered in connection with the accompanying drawings, wherein.

DESCRIPTION OF THE PREFERRED EMBODIMENTS

Figure 1:
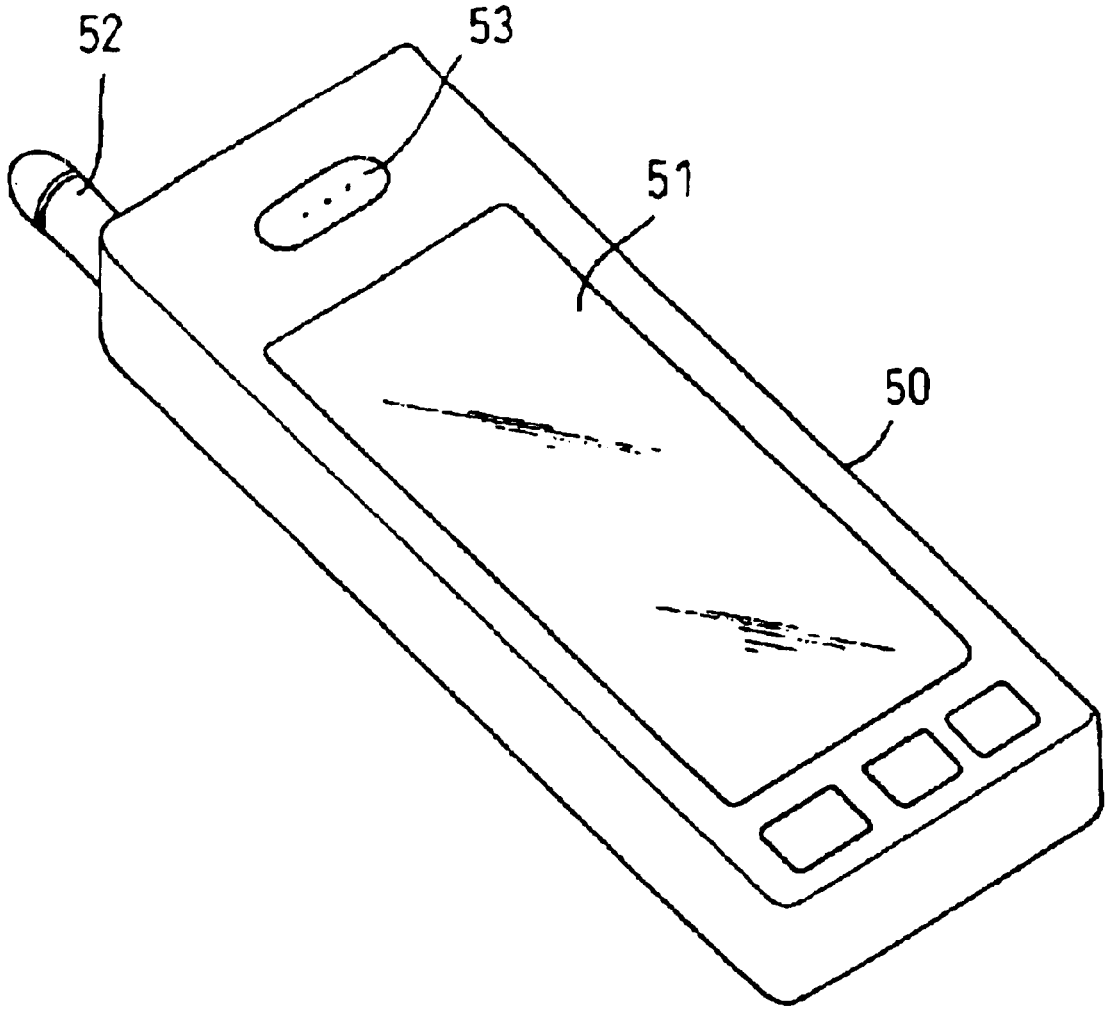
Fig. 1 (prior art)
FIG. 1 is a diagram showing an overall view of a conventional mobile cellar phone.

In describing preferred embodiments of the present invention illustrated in the drawings, specific terminology is employed for the sake of clarity. However, the present invention is not intended to be limited to the specific terminology so selected and it is to be understood that each specific element includes all technical equivalents which operate in a similar manner.

Figure 2:
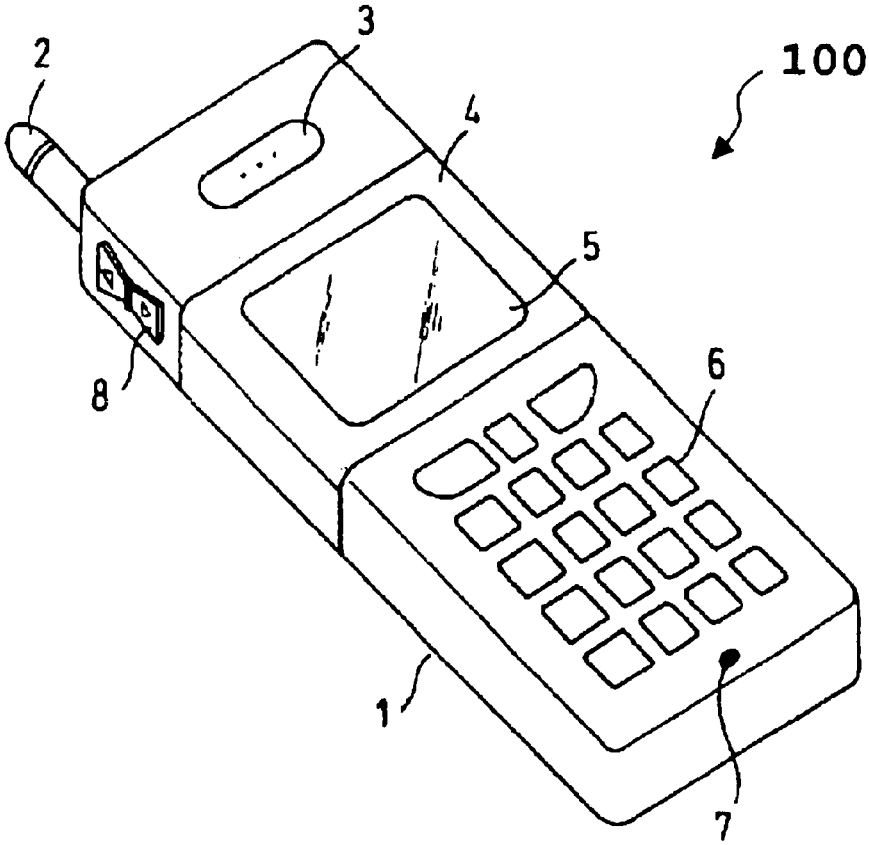
FIG. 2 is a diagram showing an overall view of a portable electronic terminal apparatus according to an embodiment of the present invention.

Referring now to the drawings, wherein like reference numerals designate identical or corresponding parts throughout the several views, and more particularly to FIG. 2 thereof, there is illustrated a portable electronic terminal apparatus 100 according to an exemplary embodiment of the present invention. The portable electronic terminal apparatus 100 includes a main body 1, an antenna 2, a loudspeaker 3, a flip panel 4, a first display 5, a data entry panel 6, a microphone 7, and a button 8.

Figure 3:
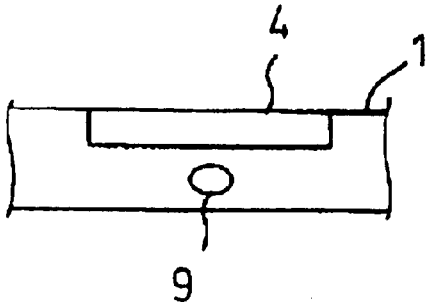
FIG. 3 is a diagram showing the location of an open button of the portable electronic terminal apparatus of FIG. 2.

In this exemplary embodiment, the main body 1 has a front surface divided into upper, middle, and lower regions to which the loudspeaker 3, the flip panel 4, and the data entry panel 6 are provided, respectively. The antenna 2 is mounted inside the main body 1 so as to protrude from the top surface of the main body 1. The microphone 7 is mounted on a portion of the lower region closer to the bottom surface of the main body 1, and the button 8 is provided to a side surface of the main body 1 near the upper region. The flip panel 4 has a left side edge portion which is movably mounted in the left side edge of the middle region of the main body 1 so that the flip panel 4 can rotate to open and close about the left side edge portion. The first display 5 is mounted on the front surface of the flip panel 4. The data entry panel 6 includes a ten-key pad, for example, and other instruction keys. In addition, the portable electronic terminal apparatus 100 further includes an open button 9 for opening the flip panel 4. The open button 9 is mounted on a side surface of the main body 1 close to the flip panel 4, as illustrated in FIG. 3.

Figure 4:
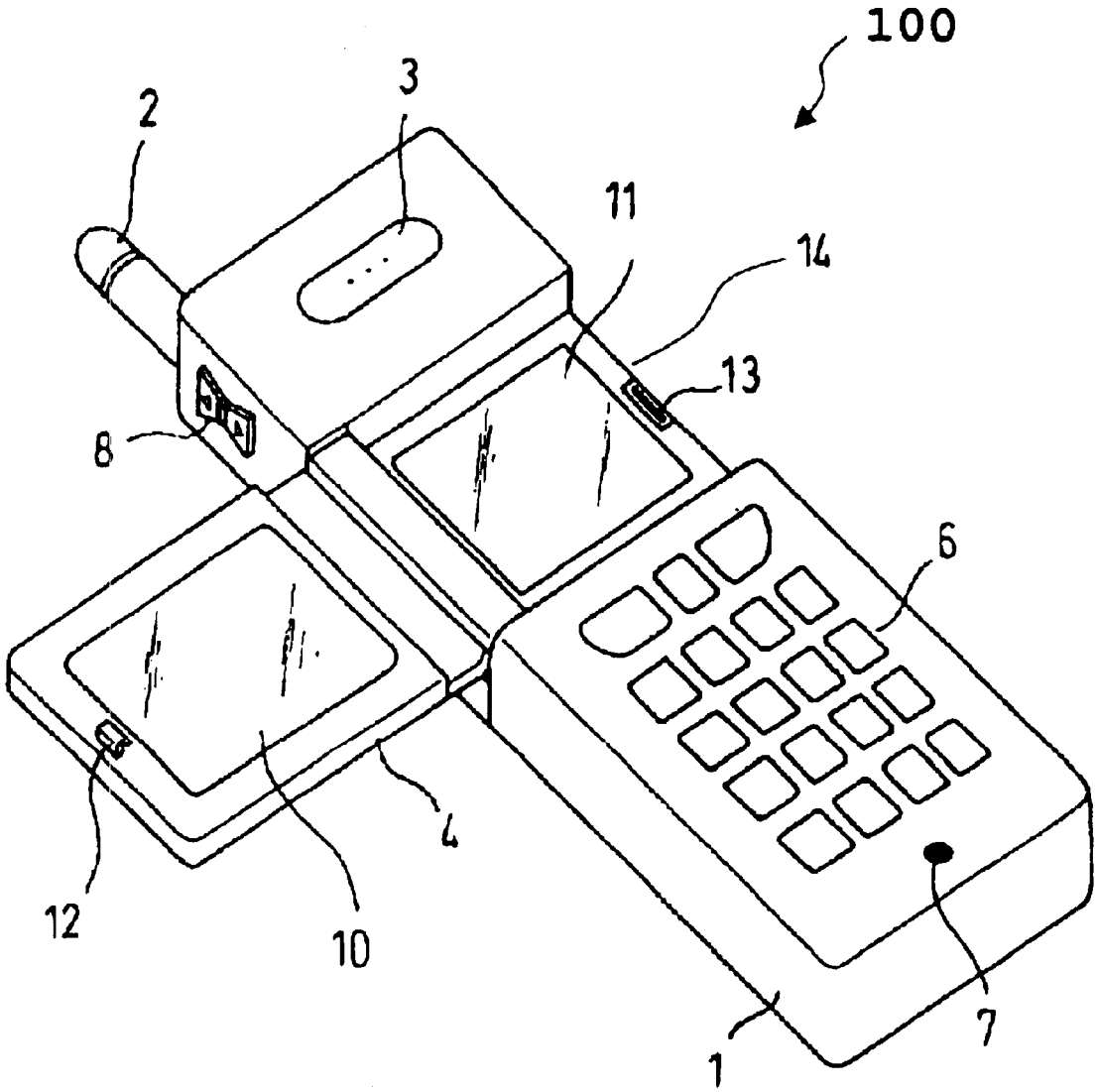
FIG. 4 is a diagram showing the portable electronic terminal apparatus of FIG. 2 with a flip panel opened.

When the open button 9 is pressed, the flip panel 4 is opened, as illustrated in FIG. 4. As illustrated in FIG. 4, the portable electronic terminal apparatus 100 further includes a second display 10, a third display 11, a hook 12, and a dent 13. A hollow section 14 is created when the flip panel 4 is opened. The second display 10 is mounted on a rear side of the flip panel 4. The second display 10 may be integral with the first display 5. The third display 11 is mounted on a portion of the main body 1 opposite to the second display 10 with the flip panel 4 closed so as to appear next to the second display 10 with the flip panel 4 opened. The hook 12 is provided to a side edge of the rear surface of the flip panel 4 so as to hook up to the main body 1 with the dent 13 mounted on the main body 1. The hollow 14 is to receive the flip panel 4 when it is closed. For the open/close mechanism of the flip panel 4, the portable electronic terminal apparatus 100 is further provided with a hook receiver (not shown) and a spring (not shown). The hook receiver is mounted on a portion of the main body 1 closer to the dent 13 and is engaged with the hook 12 when the flip panel 4 is closed. The spring is mounted on a portion of the left side edge of the flip panel 4 so as to provide a tension to the flip panel 4 to open. The above-mentioned hook receiver is associated with the movement of the open button 9 so that the flip panel 4 is opened, as illustrated in FIG. 4, with the tension of the spring when the open button is pressed and is closed, as illustrated in FIG. 2, when the user closes the flip panel 4.

Each of the first and second displays 5 and 10 may be a thinner display (i.e., a polymer-film liquid crystal display) so that the flip panel 4 can be made thinner.

Figure 5:
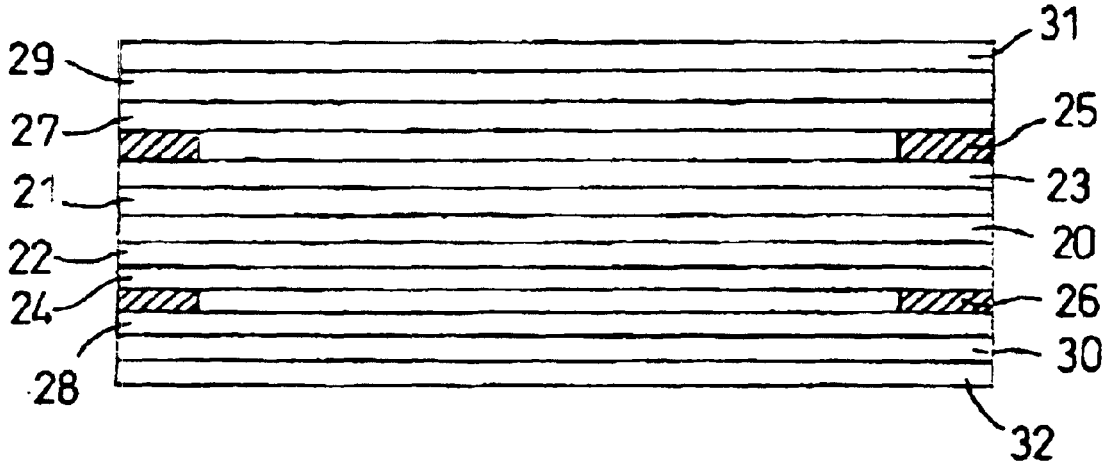
FIG. 5 is a diagram showing a structure of a display included in the portable electronic terminal apparatus of FIG. 2.

Referring to FIG. 5, an exemplary structure of a display when the first and second a displays 5 and 10 are united in one piece is explained. In FIG. 5, an exemplary structure of a display includes a reflection plate 20, first polarizing plates 21 and 22, first transparent electrodes 23 and 24, liquid crystal layers 25 and 26, second transparent electrodes 27 and 28, phase plates 29 and 30, second polarizing plates 31 and 32. That is, the first display 5 includes the first polarizing plate 21, the first transparent electrode 23, the liquid crystal layer 25, the second transparent electrode 27, the phase plate 29, and the second polarizing plate 31. Further, the second display 10 includes the first polarizing plate 22, the first transparent electrode 24, the liquid crystal layer 26, the second transparent electrode 28, the phase plate 30, and the second polarizing plate 32. The first display 5 is mounted on a front surface of and the second display 10 is mounted on a rear surface of the reflection plate 20 so that a double-sided display is configured with the flip panel 4.

When the flip panel 4 is closed, the first display 5 is supplied with power but the second and third displays 10 and 11 are not supplied with power. That is, the second and third displays 10 and 11 can only be supplied with power when the flip panel 4 is opened. In addition, the user can set a condition in which the second and third displays 10 and 11 are not supplied with power through the data entry panel 6. Accordingly, the second and third displays 10 and 11 will not be supplied with power even when the flip panel 4 is accidentally opened. As a result, it becomes possible to avoid an increase of a power consumption by an accidental opening of the flip panel 4.

Figure 6:
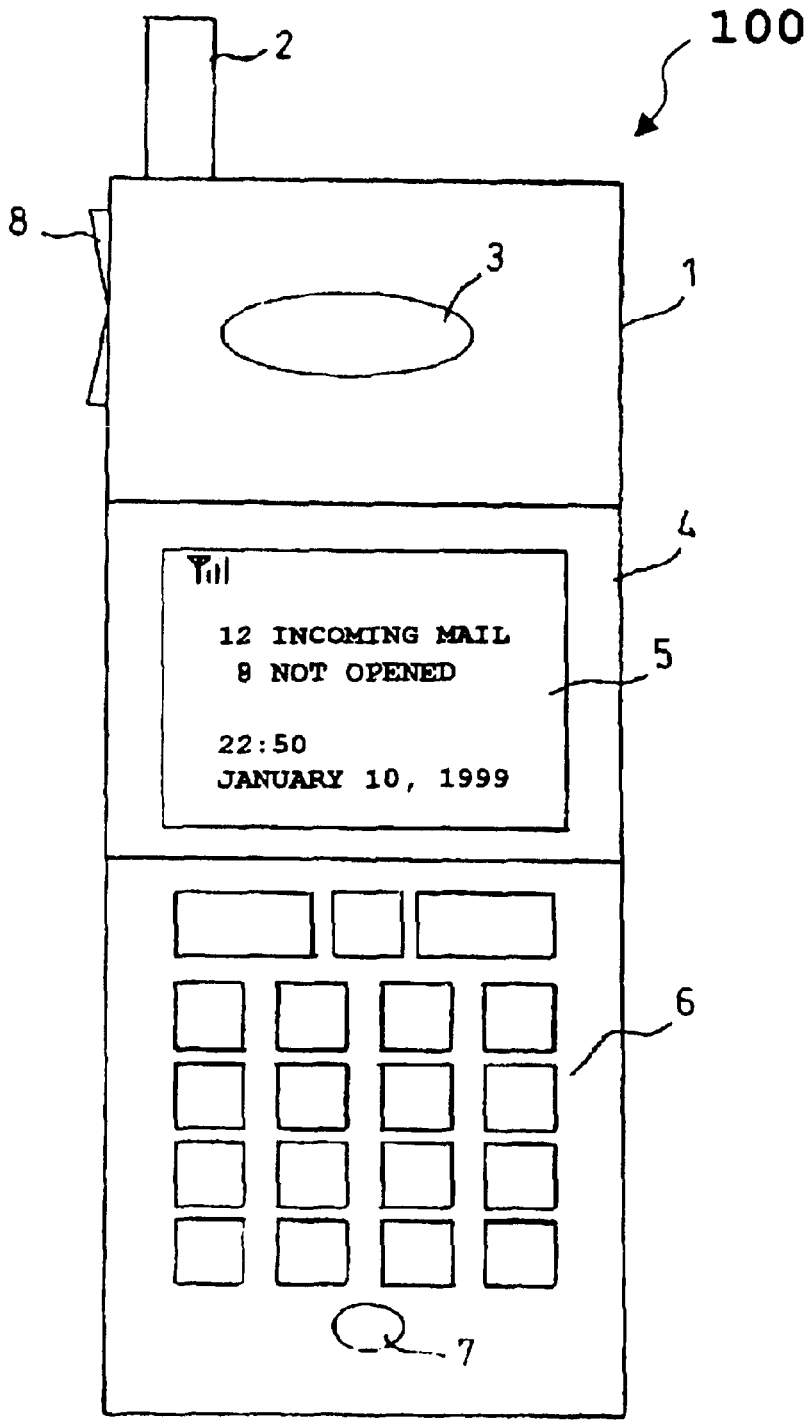
FIGS. 6 and 7 are diagrams for showing an exemplary way of reading incoming mail on the portable electronic terminal apparatus of FIG. 2.
Figure 7:
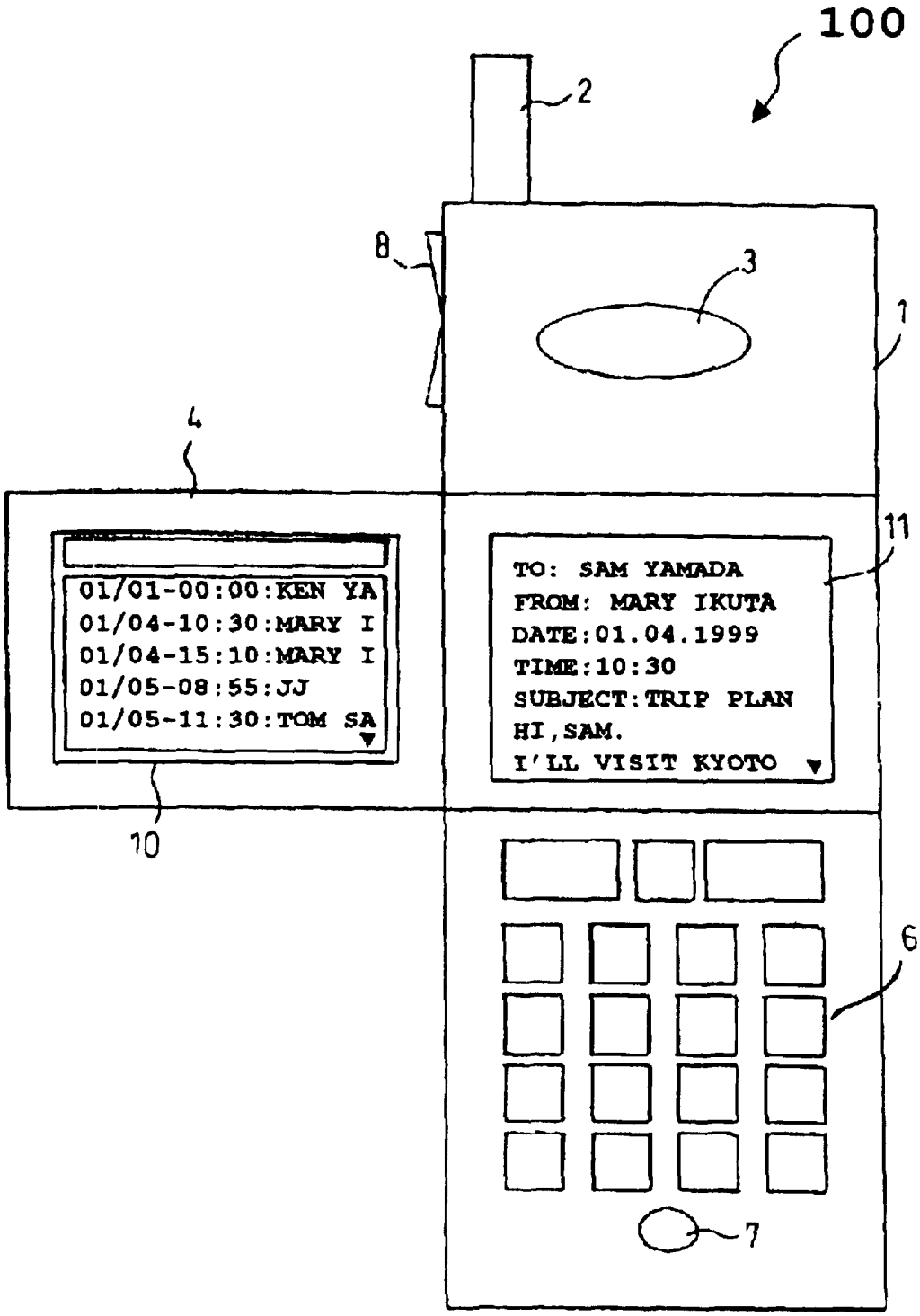

Referring to FIGS. 6 and 7, an exemplary way of using the portable electronic terminal apparatus 100 will be explained. When the portable electronic terminal apparatus 100 is not used, it stays in an idle status, as illustrated in FIG. 6. In the idle status, the flip panel 4 is closed and the first display 5 displays minimum information on it. The minimum information may include strength of the electric field (i.e., signal strength), the time of day, date, incoming mails, and so forth.

To read incoming mails, the user opens the flip panel 4 so that the second and third displays 10 and 11 show up, as illustrated in FIG. 7. In this case, the second display 10 shows a list of incoming mails and the third display 11 shows the contents of a selected incoming mail.

With the above-described structure, the portable electronic terminal apparatus 100 can conveniently display multiple pages of information. Moreover, it obviates the necessity for the user to enter the complex instructions through the data entry panel 6 to read incoming mails. Thus, the user can read incoming mails in much the similar way to read a book by turning pages.

Figure 8:
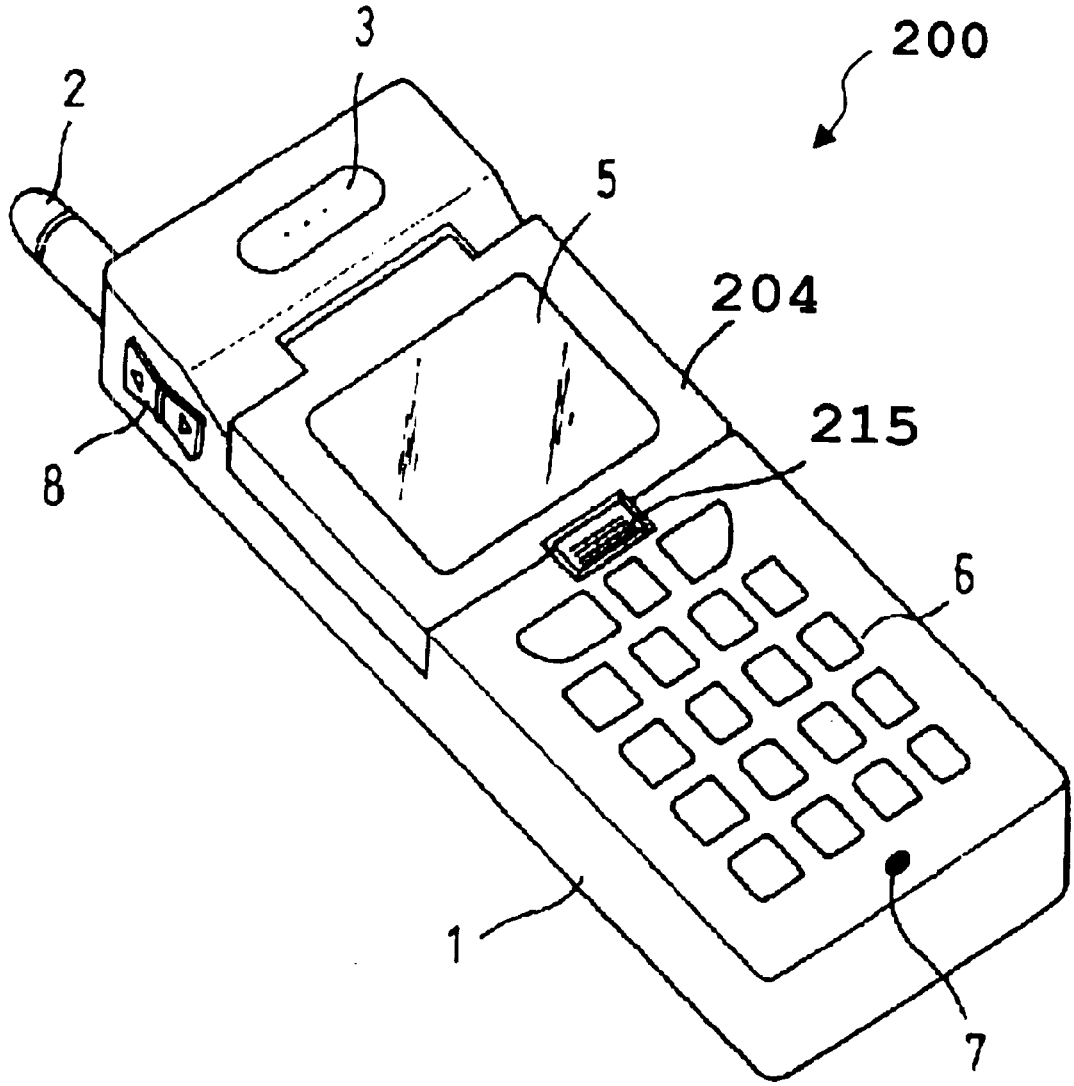
FIGS. 8 and 9 are diagrams showing a modified portable electronic terminal apparatus based on the portable electronic terminal apparatus of FIG. 2.
Figure 9:
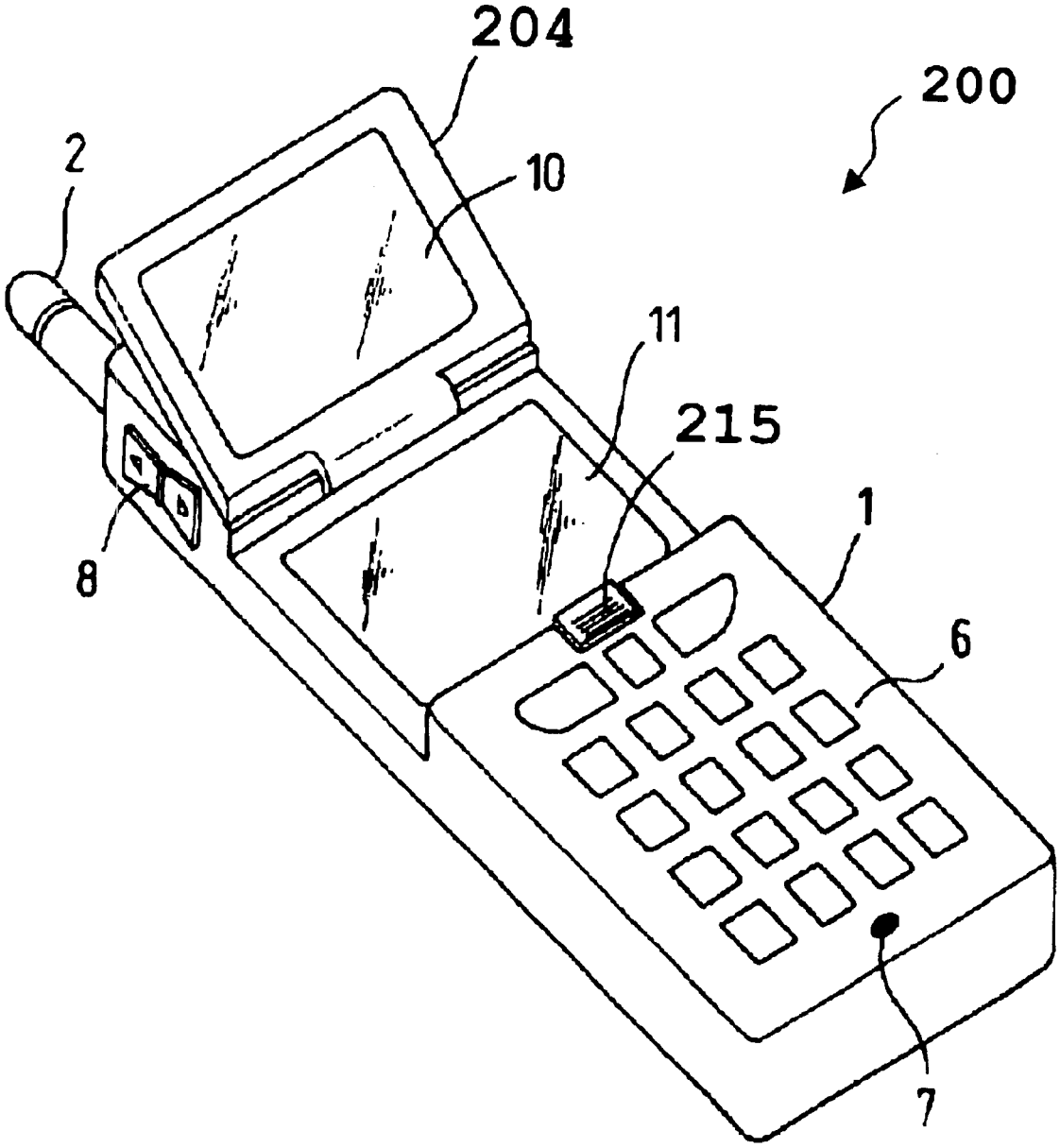

Next, a first modification made to the portable electronic terminal apparatus 100 is explained with reference to FIGS. 8 and 9. In FIG. 8, a first modified portable electronic terminal apparatus 200 is shown. The first modified portable electronic terminal apparatus 200 of FIG. 8 is similar to the portable electronic terminal apparatus 100, except for a flip panel 204 and a knob 215.

The flip panel 204 of FIG. 8 is configured to have a top edge portion which is mounted on the top edge of the middle region of the main body 1. That is, the flip panel 204 can rotate about the top edge portion to open and close while the flip panel 4 of FIG. 2 rotates about the left side edge portion. The knob 215 is engaged with a bottom portion of the flip panel 204 when the flip panel 204 is closed and the flip panel 204 is retracted in the main body 1, as illustrated in FIG. 8. To open the flip panel 204, the user needs to push or slide the knob 215 to release its engagement with the bottom portion of the flip panel 204. Consequently, the flip panel 204 is opened towards the side of the loudspeaker 3, as illustrated in FIG. 9. Because of this direction of opening, the flip panel 204 is kept out of the way of the user's hand holding the main body 1.

Figure 10:
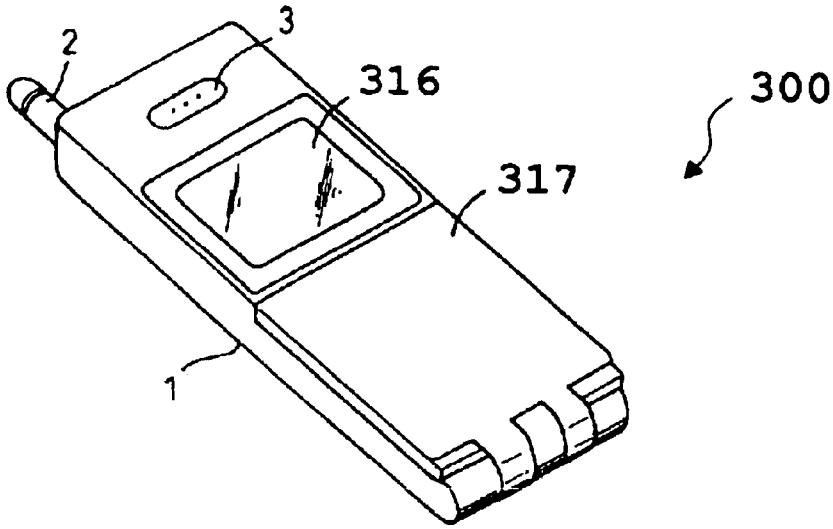
FIGS. 10 and 11 are diagrams showing another modified portable electronic terminal apparatus based on the portable electronic terminal apparatus of FIG. 2.
Figure 11:
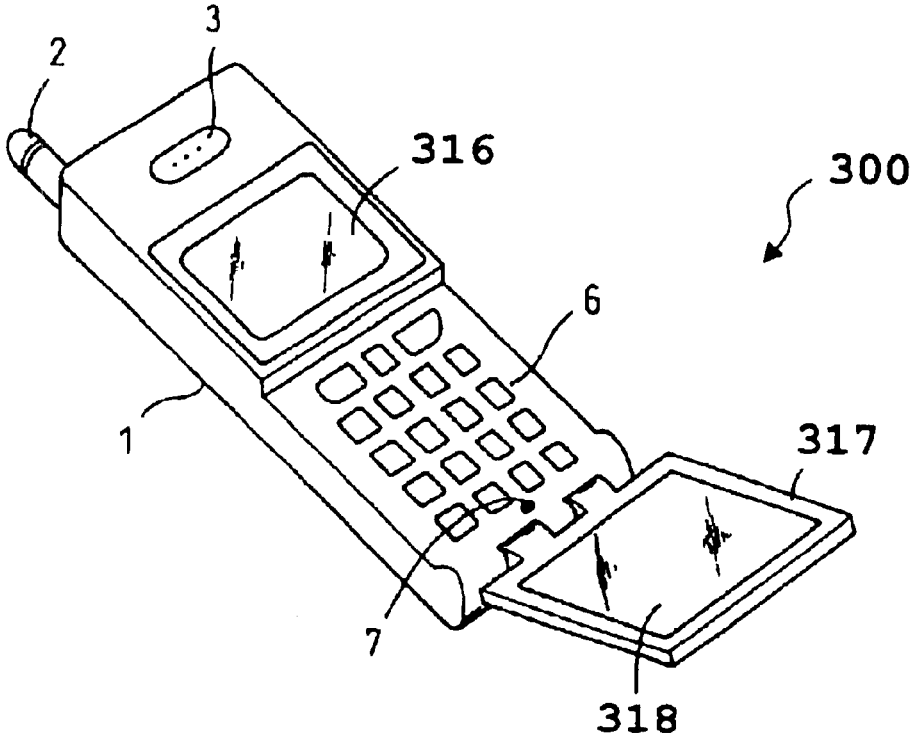

Next, a second modification made to the portable electronic terminal apparatus 100 is explained with reference to FIGS. 10 and 11. In FIG. 10, a second modified portable electronic terminal apparatus 300 is shown. The second modified portable electronic terminal apparatus 300 of FIG. 10 is similar to the portable electronic terminal apparatus 100 of FIG. 2, except for a fixed display panel 316 and a flip panel 317. The fixed display panel 316 is fixed on the middle region of the main body 1. The flip panel 317 includes a secondary display 318, as illustrated in FIG. 11. The flip panel 317 is configured to have a bottom edge portion which is mounted on the bottom of the lower region of the main body 1. That is, the flip panel 317 can rotate about the bottom edge portion to open and close while the flip panel 4 of FIG. 2 rotates about the left side edge portion. With this configuration, the data entry panel 6 can be protected by the flip panel 317 when it is closed and both of the data entry panel 6 and the secondary display 318 will show up when the flip panel 317 is opened. Thus, the display size can be extended without increasing the size of the terminal apparatus.

Numerous additional modifications and variations of the present invention are possible in the light of the above teachings. It is therefore to be understood that within the scope of the appended claims, the present invention may be practiced otherwise than as specifically described herein.

What is claimed as new and is desired to be secured by Letters Patent of the United States is:

1. A portable electronic terminal apparatus, comprising:

a main body having a hollow section;

an information input mechanism by which information including data and instructions can be input;

a plurality of displays which display said input information on a plurality of display screens;

a communications mechanism which transmits and receives said input information; and a flip panel movably mounted on said main body and configured to rotatably open and close about a side edge portion of said flip panel, said flip panel being retracted into said hollow section of said main body when closed, wherein one of said plurality of displays is mounted on a side of said flip panel display screen that is exposed when closed.

2. The apparatus as defined in claim 1, wherein another one of said plurality of displays is mounted on a surface in said hollow section of said main body.

3. The apparatus as defined in claim 1, wherein another one of said plurality of displays is mounted on another side of said flip panel.

4. The apparatus as defined in claim 1, each of said plurality of displays is a polymer-film liquid crystal display.

5. The apparatus as defined in claim 1, wherein said plurality of displays are selectively used by a user instruction input through said information input mechanism.

6. The apparatus as defined in claim 3, wherein said one of said plurality of displays operates when said flip panel is closed, and said other one of said plurality of displays operates when said flip panel is opened.

7. A portable electronic terminal apparatus, comprising:

a main body having a hollow section;

an information input mechanism by which information including data and instructions can be input;

displays means for displaying a plurality of displays of said input information on a plurality of display screens;

a communications mechanism which transmits and receives said input information; and flip panel means for movably mounted on said main body and for rotatably opening and closing about a side edge portion of a flip panel, said flip panel being retracted into said hollow section of said main body when closed, wherein one of said plurality of display means is mounted on a side of said flip panel display screen that is exposed when closed.

8. The apparatus as defined in claim 7, wherein another one of said plurality of display means is mounted on a surface in said hollow section of said main body.

9. The apparatus as defined in claim 7, wherein another one of said plurality of display means is mounted on another side of said flip panel.

10. The apparatus as defined in claim 7, each of said plurality of display means is a polymer-film liquid crystal display.

11. The apparatus as defined in claim 7, wherein said plurality of display means are selectively used by a user instruction input through said information input mechanism.

12. The apparatus as defined in claim 9, wherein said one of said plurality of display means operates when said flip panel is closed, and said other one of said plurality of display means operates when said flip panel is opened.

*13. The portable electronic terminal apparatus of claim 1, wherein,*

*another one of said plurality of displays is mounted on another side of said flip panel, and*

*power supplied to the one of said plurality of displays and to the another one of said plurality of displays can be reduced when the flip panel is open and also when the flip panel is closed.*

*14. The portable electronic terminal apparatus of claim 7, wherein,*

*another one of said plurality of display means is mounted on another side of said flip panel, and*

*power supplied to the one of said plurality of display means and to the another one of said plurality of display means can be reduced when the flip panel is open and when the flip panel is closed.*

*15. In a portable electronic communication device having a body, the improvement comprising:*

*first and second display screens mounted on opposite sides of a panel, said panel movably attached to the body, the first display screen being arranged to face the body if the panel is closed, and an adjustable unit configured to be set to reduce power supplied to the first display screen if the panel is open and the portable electronic communication device is powered on.*

*16. The portable electronic communication device of claim 15, further comprising:*

*a third display screen mounted on the body.*

*17. The portable electronic communication device of claim 15, wherein the second display screen is configured to display status information.*

*18. The portable electronic communication device of claim 15, wherein the second display screen is configured to display the status information when the panel is closed.*

*19. The portable electronic communication device of claim 15, wherein power supplied to the first and second display screens can be reduced when the panel is open and when the panel is closed.*

*20. The portable electronic communication device of claim 18, wherein the status information includes a combination of a strength of an electric field, a time of day, date information, and an indication of incoming electronic mail.*

*21. A portable electronic communication device, comprising:*

*a data entry mechanism;*

*a plurality of displays configured to indicate information including data entered through the data entry mechanism;*

*a communications mechanism connected to the data entry mechanism and the plurality of displays; and*

*a panel having a front side and a rear side, said panel configured to be openable and closable, wherein,*

*at least one of the plurality of displays is disposed on each of the front and rear sides of the panel, and*

*power supplied to a first one of the plurality of displays which is not viewable when the panel is closed can be reduced when the panel is open and when the portable electronic communication device is powered on.*

*22. The portable electronic communication device of claim 21, wherein the plurality of displays includes a first display screen and a second display screen, each simultaneously visible when the panel is rotated away from the first display screen.*

*23. The portable electronic communication device of claim 21, wherein the first one of the plurality of displays is powered off when the panel is open and the portable electronic communication device is powered on.*

*24. The portable electronic communication device of claim 21, wherein a second one of the plurality of displays which is viewable when the panel is closed is configured to display status information.*

*25. The portable electronic communication device of claim 21, wherein power supplied to the at least one of the plurality of displays disposed on each of the front and rear sides of the panel can be reduced when the panel is open and when the panel is closed.*

*26. The portable electronic communication device of claim 22, wherein the panel is hingedly attached along a lateral side of the first display screen.*

*27. The portable electronic communication device of claim 23, wherein the first one of the plurality of displays is powered off further when a predetermined condition has been set in the portable electronic communication device.*

*28. The portable electronic communication device of claim 24, wherein the second one of the plurality of displays is configured to display the status information when the panel is closed.*

*29. The portable electronic communication device of claim 26, further comprising:*

*a power supply operably connected to the first and second display screens by at least one switch.*

*30. The portable electronic communication device of claim 27, wherein the predetermined condition is set by a user.*

*31. The portable electronic communication device of claim 28, wherein the status information includes a strength of an electric field.*

*32. The portable electronic communication device of claim 28, wherein the status information includes date information.*

*33. The portable electronic communication device of claim 28, wherein the status information includes an indication of incoming electronic mail.*

*34. The portable electronic communication device of claim 29, wherein at least one of the first and second display screens comprise a scrollable screen.*

*35. The portable electronic communication device of claim 30, wherein the predetermined condition is set by a user to avoid an increase in power consumption by an accidental opening of the panel.*

*36. The portable electronic communication device of claim 31, wherein the status information includes a time of day.*

*37. A portable electronic communication device, comprising:*

*a data entry mechanism;*

*a plurality of displays configured to indicate information including data entered through the data entry mechanism;*

*a communications mechanism connected to the data entry mechanism and the plurality of displays; and*

*a panel configured to be openable and closable,*

*wherein at least one of the plurality of displays is disposed on the panel and is configured to indicate at least one of an electronic field strength and a time,*

*another one of the plurality of displays is disposed on the panel and is not viewable if the panel is closed, and*

*the communication device comprises an adjustable unit configured to be set to reduce power supplied to the another one of the plurality of displays if the panel is open and the portable electronic communication device is powered on.*

*38. The portable electronic communication device of claim 37, wherein the plurality of displays includes a first display screen and a second display screen, each simultaneously visible when the panel is rotated away from the first display screen.*

*39. The portable electronic communication device of claim 37, wherein the another one of the plurality of displays is powered off when the panel is open, when the portable electronic communication device is powered on, and when a predetermined condition has been set in the portable electronic communication device.*

*40. The portable electronic communication device of claim 37, wherein power supplied to the at least one of the plurality of displays and to the another one of the plurality of displays can be reduced when the panel is open and when the panel is closed.*

*41. The portable electronic communication device of claim 38, wherein the panel is hingedly attached along a lateral side of the first display screen.*

*42. The portable electronic communication device of claim 39, wherein the predetermined condition is set by a user.*

*43. The portable electronic communication device of claim 39, wherein the predetermined condition is set by a user to avoid an increase in power consumption by an accident opening of the panel.*

*44. The portable electronic communication device of claim 39, wherein the at least one of the plurality of displays is configured to indicate at least one of an electric field strength and a time when the panel is closed.*

*45. The portable electronic communication device of claim 41, further comprising:*

*a power supply operably connected to the first and second display screens by at least one switch.*

*46. The portable electronic communication device of claim 44, wherein the at least one of the plurality of displays is further configured to display at least one of date information and an indication of incoming electronic mail.*

*47. The portable electronic communication device of claim 45, wherein at least one of the first and second display screens comprise:*

*a scrollable screen.*

*48. A method of controlling a communication device, comprising:*

*moving a panel, which includes first and second display screens mounted thereon, to an open position relative to a body; and*

*reducing power supplied to the first display screen when the panel is open and when the communication device is powered on.*

*49. The method according to claim 48, further comprising:*

*moving the panel to a closed position in which the first display screen faces the body.*

*50. The method according to claim 48, wherein moving the panel comprises moving the panel that includes the first and second display screens mounted on opposite side of the panel.*

*51. The method according to claim 49, wherein moving the panel to the open position comprises rotating the panel about an axis.*

*52. A method of controlling operation of a communication device, comprising:*

*moving a panel, which includes first and second displays, to a closed position such that the first display is covered and the second display is observed;*

*moving the panel to an open position such that the first display is observed; and*

*reducing power supplied to the first display when the panel is in the open position and the communication device is powered on.*

*53. The method according to claim 52, further comprising:*

*indicating on one of the first and second displays information that is entered through a data entry mechanism.*

*54. The method according to claim 53, further comprising:*

*indicating at least one of an electronic field strength and a time on the first or second display.*

* * * * *

UNITED STATES PATENT AND TRADEMARK OFFICE

CERTIFICATE OF CORRECTION

PATENT NO. : RE40,204 E
APPLICATION NO. : 10/677170
DATED : April 1, 2008
INVENTOR(S) : Katsuhisa Yamamoto It is certified that error appears in the above-identified patent and that said Letters Patent is hereby corrected as shown below:

In the Specification

Column 1, lines 11-18, above the heading, "CROSS-REFERENCE TO RELATED APPLICATIONS", should read—Notice: More than one reissue application has been filed for the reissue of Patent No. 6,297,945. The reissue applications are application numbers 10/677,170 (Parent reissue application), filed October 2, 2003 (Attorney Docket No. 236659US2RE), divisional reissue application 11/877,458 (Attorney Docket No. 313357US28RE DIV) now abandoned, and continuation reissue application 12/911,350 (Attorney Docket No. 370707US28RE CONT).

Signed and Sealed this
Eighth Day of October, 2013

Teresa Stanek Rea
*Deputy Director of the United States Patent and Trademark Office*